United States Patent
Kautzleben et al.

(10) Patent No.: US 7,493,624 B1
(45) Date of Patent: Feb. 17, 2009

(54) MANAGEMENT ARCHITECTURE AND METHOD EMPLOYED WITHIN A CLUSTERED NODE CONFIGURATION

(75) Inventors: Reinhold Kautzleben, Karlsruhe (DE); Gregor K. Frey, Lorsch (DE); Miroslav R. Petrov, Sofia (BG)

(73) Assignee: SAP AG, Walldorf (DE)

( * ) Notice: Subject to any disclaimer, the term of this patent is extended or adjusted under 35 U.S.C. 154(b) by 851 days.

(21) Appl. No.: 10/749,733

(22) Filed: Dec. 30, 2003

(51) Int. Cl.
G06F 3/00 (2006.01)
G06F 9/44 (2006.01)
G06F 9/46 (2006.01)
G06F 13/00 (2006.01)

(52) U.S. Cl. ...................... 719/316; 718/100
(58) Field of Classification Search ................ 719/316; 709/224; 718/100
See application file for complete search history.

(56) References Cited

U.S. PATENT DOCUMENTS

| | | | |
|---|---|---|---|
| 6,061,721 A * | 5/2000 | Ismael et al. ............... 709/223 |
| 6,083,281 A | 7/2000 | Diec et al. |
| 6,134,581 A | 10/2000 | Ismael et al. |
| 6,144,967 A | 11/2000 | Nock |
| 6,212,520 B1 | 4/2001 | Maruyama et al. |
| 6,308,208 B1 | 10/2001 | Jung et al. |
| 6,351,776 B1 * | 2/2002 | O'Brien et al. ............. 709/245 |
| 6,356,931 B2 | 3/2002 | Ismael et al. |
| 6,427,228 B1 | 7/2002 | Wigger |
| 6,539,501 B1 | 3/2003 | Edwards |
| 6,553,403 B1 | 4/2003 | Jarriel et al. |
| 6,567,809 B2 | 5/2003 | Santosuosso |
| 6,681,232 B1 | 1/2004 | Sistanizadeh |
| 6,738,933 B2 | 5/2004 | Fraenkel et al. |
| 6,772,178 B2 | 8/2004 | Mandal et al. |
| 6,789,257 B1 * | 9/2004 | MacPhail ............... 719/316 |
| 6,792,456 B1 | 9/2004 | Hellerstein et al. |
| 6,792,460 B2 | 9/2004 | Oulu et al. |
| 6,795,791 B2 | 9/2004 | Gorman |
| 6,802,067 B1 | 10/2004 | Camp et al. |

(Continued)

OTHER PUBLICATIONS

Sun Microsystems, Inc. "The Source For Developers: Core Java, Java Managmenet Extension (JMX)", 2 pages, http://java.sun.com/products/JavaMangement/ (currently version 1.2.1 Reference implementation)—continued printed on Apr. 2, 2004.

(Continued)

*Primary Examiner*—Li B Zhen
*Assistant Examiner*—Nathan Price
(74) *Attorney, Agent, or Firm*—Blakely Sokoloff Taylor & Zafman

(57) ABSTRACT

A monitoring system and method are described which simplify the management of complex, multi-tiered networks such as those used in large enterprises. A cluster of application servers are communicatively coupled on a network to serve applications over the network to a plurality of clients. Each of the application servers includes a plurality of server nodes and at least one dispatcher node. Each of the server nodes and dispatchers is assigned its own dedicated management bean ("MBean") server and each of the MBean servers are associated with a plurality of MBeans for monitoring specified system resources. In addition, one embodiment of the invention includes cluster integration logic which collects and compiles resource data from each of the individual MBeans and provides the compiled data in a predefined organizational structure to a management interface.

16 Claims, 17 Drawing Sheets

U.S. PATENT DOCUMENTS

| | | | |
|---|---|---|---|
| 6,834,301 B1 | 12/2004 | Hanchett | |
| 6,851,118 B1 | 2/2005 | Ismael et al. | |
| 6,952,726 B1 | 10/2005 | White et al. | |
| 6,990,601 B1 | 1/2006 | Tsuneya et al. | |
| 6,993,453 B2 | 1/2006 | Krissell | |
| 7,000,235 B2 | 2/2006 | Mandal et al. | |
| 7,017,051 B2 | 3/2006 | Patrick | |
| 7,017,162 B2 | 3/2006 | Smith | |
| 7,024,474 B2 | 4/2006 | Clubb et al. | |
| 7,062,540 B2 | 6/2006 | Reddy et al. | |
| 7,069,267 B2 | 6/2006 | Spencer | |
| 7,086,065 B1 | 8/2006 | Yeluripati et al. | |
| 7,152,104 B2 | 12/2006 | Musante et al. | |
| 7,174,370 B1 | 2/2007 | Sain et al. | |
| 7,200,588 B1 | 4/2007 | Srivastava et al. | |
| 7,203,868 B1 | 4/2007 | Evoy | |
| 7,206,827 B2 | 4/2007 | Viswanath et al. | |
| 7,209,898 B2 | 4/2007 | Pfeiffer | |
| 7,233,989 B2 * | 6/2007 | Srivastava et al. | 709/224 |
| 2002/0029298 A1 * | 3/2002 | Wilson | 709/316 |
| 2002/0186238 A1 | 12/2002 | Sylor et al. | |
| 2002/0188610 A1 * | 12/2002 | Spencer, Jr. | 707/10 |
| 2003/0051102 A1 * | 3/2003 | Jacobs et al. | 711/145 |
| 2003/0120593 A1 | 6/2003 | Bansal et al. | |
| 2003/0167304 A1 | 9/2003 | Zhu et al. | |
| 2003/0225851 A1 | 12/2003 | Fanshier | |
| 2004/0022237 A1 | 2/2004 | Elliott et al. | |
| 2004/0073782 A1 * | 4/2004 | Price et al. | 713/1 |
| 2004/0078722 A1 | 4/2004 | Pfeiffer et al. | |
| 2004/0148610 A1 | 7/2004 | Tsun et al. | |
| 2004/0249613 A1 | 12/2004 | Sprogis et al. | |
| 2004/0268314 A1 | 12/2004 | Kollman et al. | |
| 2005/0010608 A1 | 1/2005 | Horikawa | |
| 2005/0038889 A1 | 2/2005 | Frietsch | |
| 2005/0097110 A1 | 5/2005 | Nishanov et al. | |
| 2005/0132337 A1 | 6/2005 | Wedel et al. | |

OTHER PUBLICATIONS

Non-Final Office Action for U.S. Appl. No. 10/813,788 mailed Jul. 31, 2008.
Office Action mailed Jun. 20, 2008 for U.S. Appl. No. 10/749,850.
Office Action mailed Jun. 4, 2008 for U.S. Appl. No. 10/750,007.

* cited by examiner

MANAGEMENT ARCHITECTURE AND METHOD EMPLOYED WITHIN A CLUSTERED NODE CONFIGURATION

BACKGROUND

1. Field of the Invention

This invention relates generally to the field of data processing systems. More particularly, the invention relates to a management architecture employed within a clustered node configuration.

2. Description of the Related Art

Multi-Tier Enterprise Application Systems

Traditional client-server systems employ a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1b. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1b may be implemented using a variety of different application technologies at each of the layers of the multi-tier architecture, including those based on the Java 2 Enterprise Edition™ ("J2EE") standard, the Microsoft .NET standard and/or the Advanced Business Application Programming ("ABAP") standard developed by SAP AG. For example, in a J2EE environment, the business layer 122, which handles the core business logic of the application, is comprised of Enterprise Java Bean ("EJB") components with support for EJB containers. Within a J2EE environment, the presentation layer 121 is responsible for generating servlets and Java Server Pages ("JSP") interpretable by different types of browsers at the user interface layer 120.

Although multi-tiered systems such as that illustrated in FIG. 1b provide a more flexible and scalable architecture, they are extremely complex and difficult to manage. For example, providing management capabilities for multiple clusters of presentation layer servers, business layer servers and databases, and the dependencies between them requires a significant amount of administration overhead. In fact, many enterprise networks today employ a patchwork of incompatible and/or proprietary management software, resulting in a burden on end users and network administrators. While new management technologies such as the Java Management Extensions ("JMX") specification provide improved integration of management features, these technologies fail to address certain characteristics of large enterprise systems. Accordingly, new technologies which simplify the management of large enterprise networks are desirable.

SUMMARY

A monitoring system and method are described which simplify the management of complex, multi-tiered networks such as those used in large enterprises. A cluster of application servers are communicatively coupled on a network to serve applications over the network to a plurality of clients. Each of the application servers includes a plurality of server nodes and at least one dispatcher node. Each of the server nodes and dispatchers is assigned its own dedicated management bean ("MBean") server and each of the MBean servers are associated with a plurality of MBeans for monitoring specified system resources. In addition, one embodiment of the invention includes cluster integration logic which collects and compiles resource data from each of the individual MBeans and provides the compiled data in a predefined organizational structure to a management interface.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for managing multiple application server clusters using a central management arrangement. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Java Management Extensions ("JMX")

In many modern computing systems and networks, including those described above which utilize complex, multi-tier architectures, monitoring of system resources and components is of significant importance to ensure not only the reliability and security of information flow, but also to promptly detect system deficiencies so that they are corrected in a timely manner. The Java Management Extensions ("JMX") specification defines an architecture for application and network management and monitoring in a J2EE environment. Using JMX, developers of Java technology-based applications can instrument Java platform code, create smart agents and managers in the Java programming language, and implement distributed management functionality into existing systems.

Figure 1A:
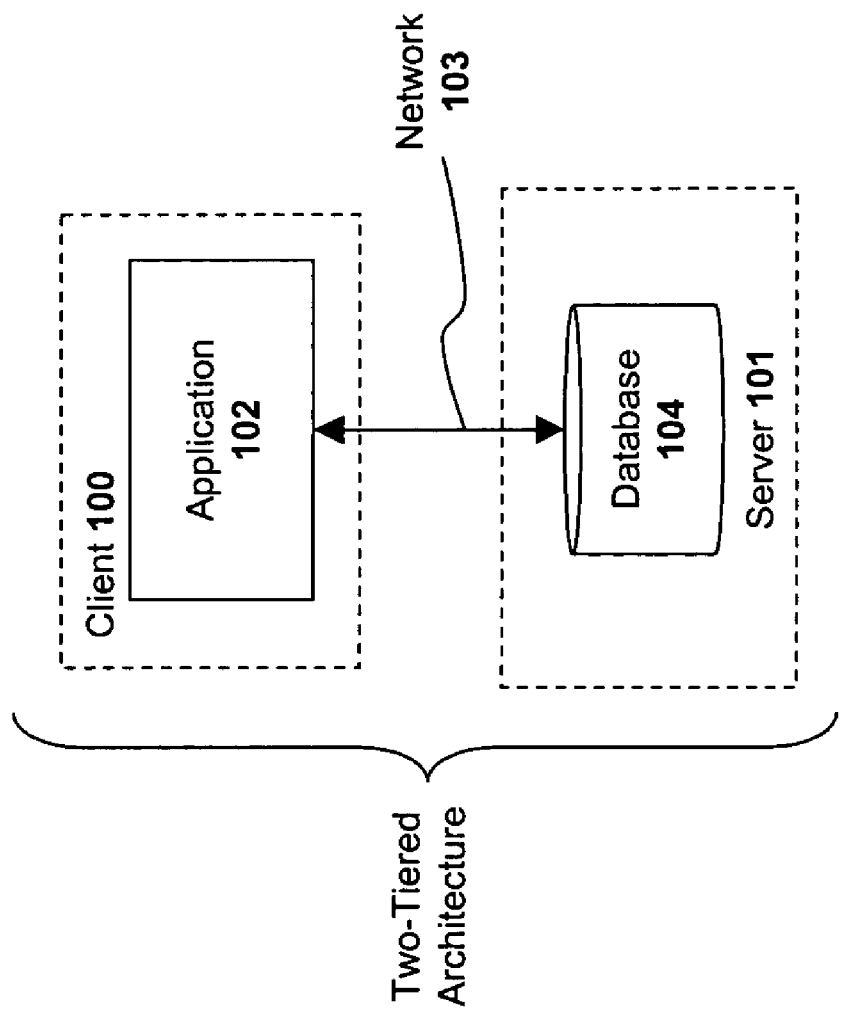
FIG. 1a illustrates a traditional two-tier client-server architecture.
Figure 1B:
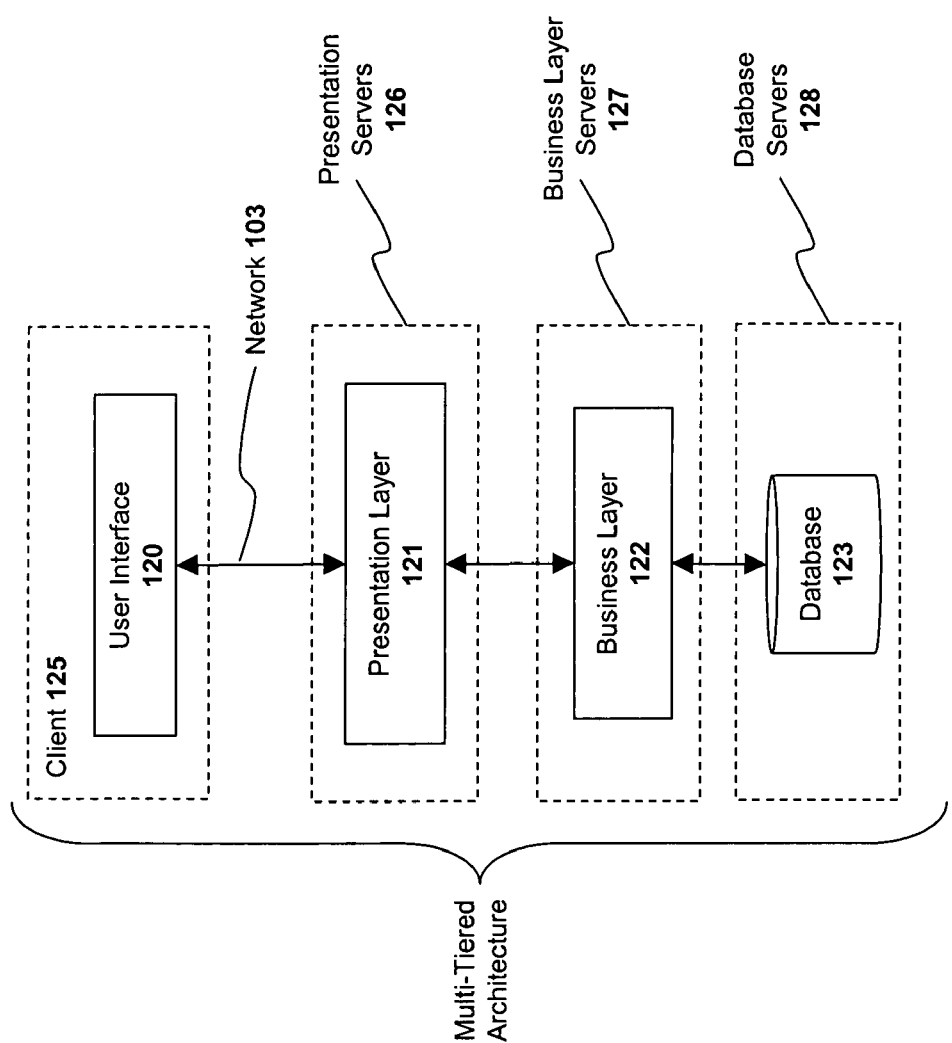
FIG. 1b illustrates a prior art multi-tier client-server architecture.
Figure 2:
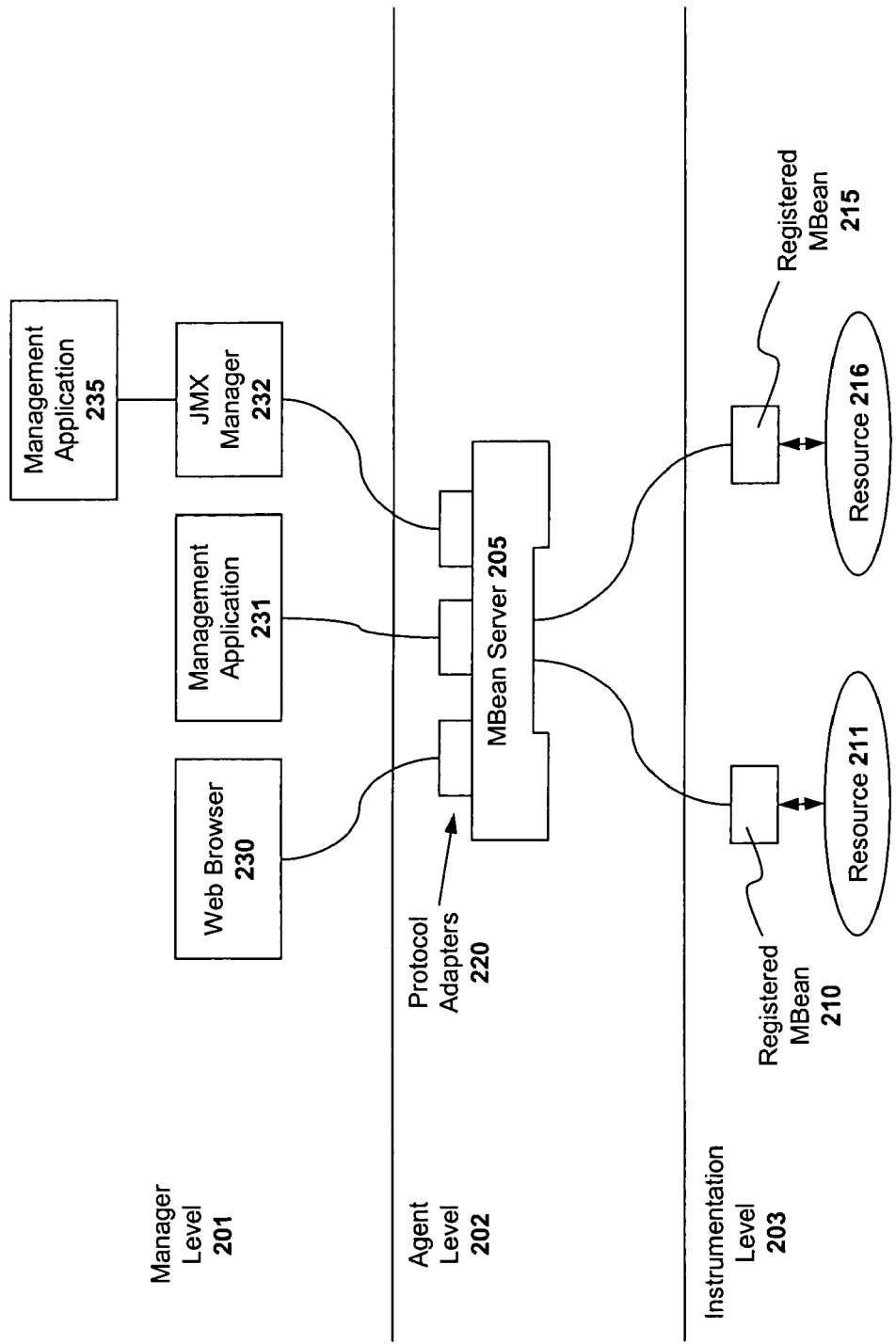
FIG. 2 illustrates the various levels of the Java Management Extensions ("JMX") architecture.

As illustrated in FIG. 2, the JMX architecture is divided into three levels: an "instrumentation" level 293; an "agent" level 202; and a "manager" level 201. At the instrumentation level 203, Java management beans ("MBeans") 210, 215 are used to manage manageable system resources 211, 216, respectively. A "manageable" resource is a resource that has been instrumented in accordance with the JMX instrumentation-level specification. By way of example, a manageable resource may include components of a business application, a device, or the implementation of a service or policy. MBeans 210, 215 are Java objects that represent the JMX manageable resources 211, 216.

An MBean server 205 at the agent level 202 is a registry for MBeans. A JMX "agent" is composed of an MBean server 205, a set of MBeans 210, 215 registered with the MBean server 205 (i.e., representing managed resources 211, 216), and one or more protocol adaptors and/or connectors 220. The MBean server 205 is a J2EE component which provides services that allow the manipulation of MBeans. All management operations performed on MBeans are performed via the MBean server 205.

The manager level 201 provides management components that can operate as a manager or agent for distribution and consolidation of management services. Different management interfaces may be employed at the management level such as Web Browsers 230 and/or proprietary management applications 231, 235. JMX managers 232 implemented within the manager level 201 provide an interface for management applications to interact with the agent, distribute or consolidate management information, and provide security.

A detailed description of the JMX specification can be found on the Sun Website (currently version 1.2.1 Reference Implementation).

An Exemplary Application Server System

In one embodiment of the invention, the management techniques which are the focus of this application are used to manage resources within a cluster of application servers. An exemplary application server architecture will now be described, followed by a detailed description of the management architecture and associated processes.

Figure 3:
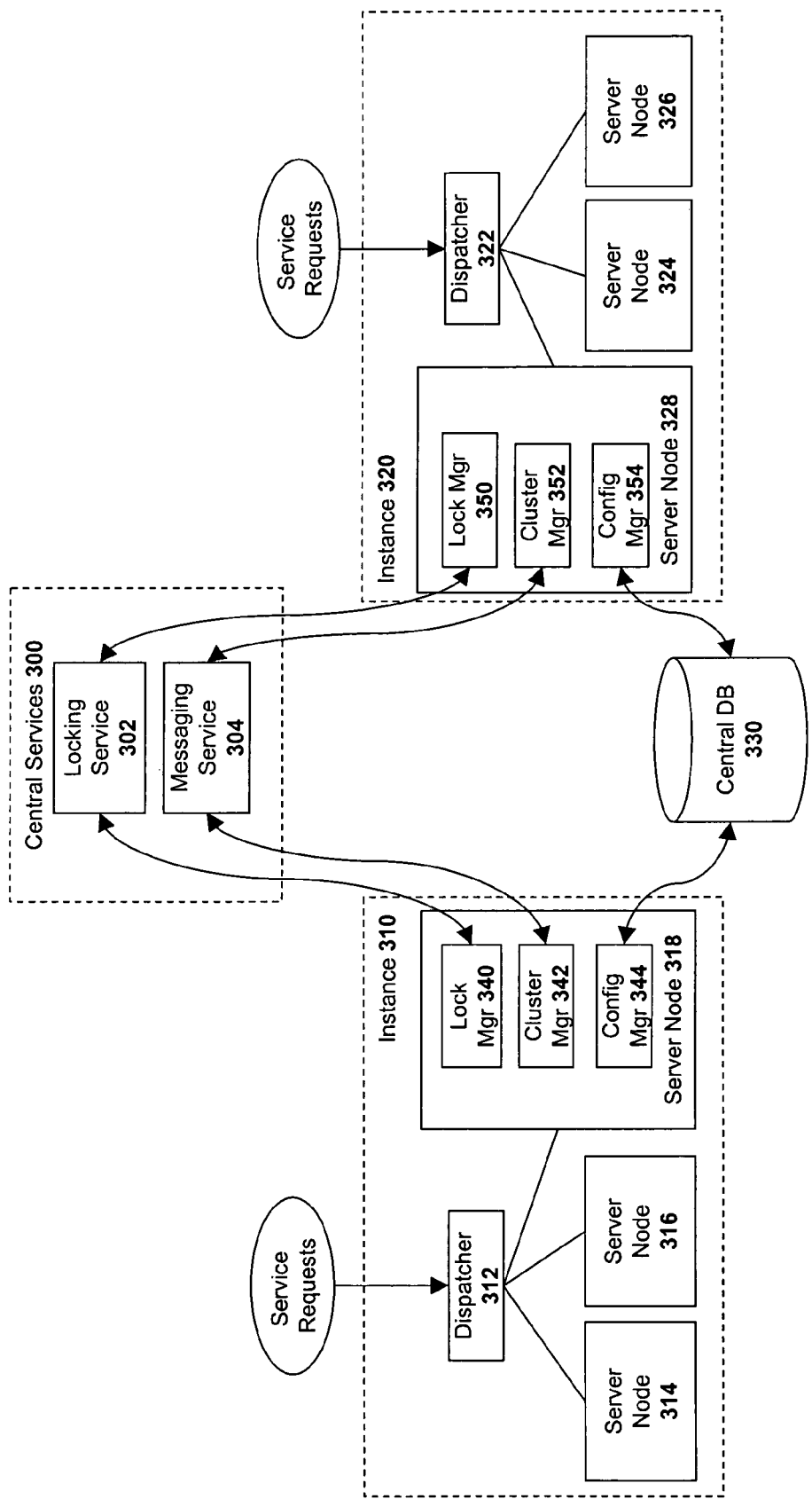
FIG. 3 illustrates a clustered application server architecture on which embodiments of the invention are employed.

An application server architecture employed in one embodiment of the invention is illustrated in FIG. 3. The architecture includes a central services "instance" 300 and a plurality of application server "instances" 310, 320. As used herein, the application server instances, 310 and 320, each include a group of server nodes 314, 316, 318 and 324, 326, 328, respectively, and a dispatcher, 312, 322, respectively. The central services instance 300 includes a locking service 302 and a messaging service 304 (described below). The combination of all of the application instances 310, 320 and the central services instance 300 is referred to herein as a "cluster." Although the following description will focus solely on instance 310 for the purpose of explanation, the same principles apply to other instances such as instance 320.

The server nodes 314, 316, 318 within instance 310 provide the business and/or presentation logic for the network applications supported by the system. Each of the server nodes 314, 316, 318 within a particular instance 310 may be configured with a redundant set of application logic and associated data. In one embodiment, the dispatcher 310 distributes service requests from clients to one or more of the server nodes 314, 316, 318 based on the load on each of the servers. For example, in one embodiment, the dispatcher 210 implements a round-robin policy of distributing service requests (although various alternate load balancing techniques may be employed).

In one embodiment of the invention, the server nodes 314, 316, 318 are Java 2 Enterprise Edition ("J2EE") server nodes which support Enterprise Java Bean ("EJB") components and EJB containers (at the business layer) and Servlets and Java Server Pages ("JSP") (at the presentation layer). Of course, certain aspects of the invention described herein may be implemented in the context of other software platforms including, by way of example, Microsoft .NET platforms and/or the Advanced Business Application Programming ("ABAP") platforms developed by SAP AG, the assignee of the present application.

In one embodiment, communication and synchronization between each of the instances 310, 320 is enabled via the central services instance 300. As illustrated in FIG. 3, the central services instance 300 includes a messaging service 304 and a locking service 302. The message service 304 allows each of the servers within each of the instances to communicate with one another via a message passing protocol. For example, messages from one server may be broadcast to all other servers within the cluster via the messaging service 304. In addition, messages may be addressed directly to specific servers within the cluster (i.e., rather than being broadcast to all servers).

In one embodiment, the locking service 302 disables access to (i.e., locks) certain specified portions of configuration data and/or program code stored within a central database 330. A locking manager 340, 350 employed within the server nodes locks data on behalf of various system components which need to synchronize access to specific types of data and program code (e.g., such as the configuration managers 344, 354 illustrated in FIG. 3). As described in detail below, in one embodiment, the locking service 302 enables a distributed caching architecture for caching copies of server/dispatcher configuration data.

In one embodiment, the messaging service 304 and the locking service 302 are each implemented on dedicated servers. However, the messaging service 304 and the locking service 302 may be implemented on a single server or across multiple servers while still complying with the underlying principles of the invention.

As illustrated in FIG. 3, each application server (e.g., 318, 328) includes a lock manager 340, 350 for communicating with the locking service 302; a cluster manager 342, 352 for communicating with the messaging service 204; and a configuration manager 344, 354 for communicating with a central database 330 (e.g., to store/retrieve configuration data). Although the lock manager 340, 350, cluster manager 342, 352 and configuration manager 344, 354 are illustrated with respect to particular server nodes, 318 and 328, in FIG. 3, each of the server nodes 314, 316, 324 and 326 and/or on the dispatchers 312, 322 may be equipped with equivalent lock managers, cluster managers and configuration managers.

Figure 4:
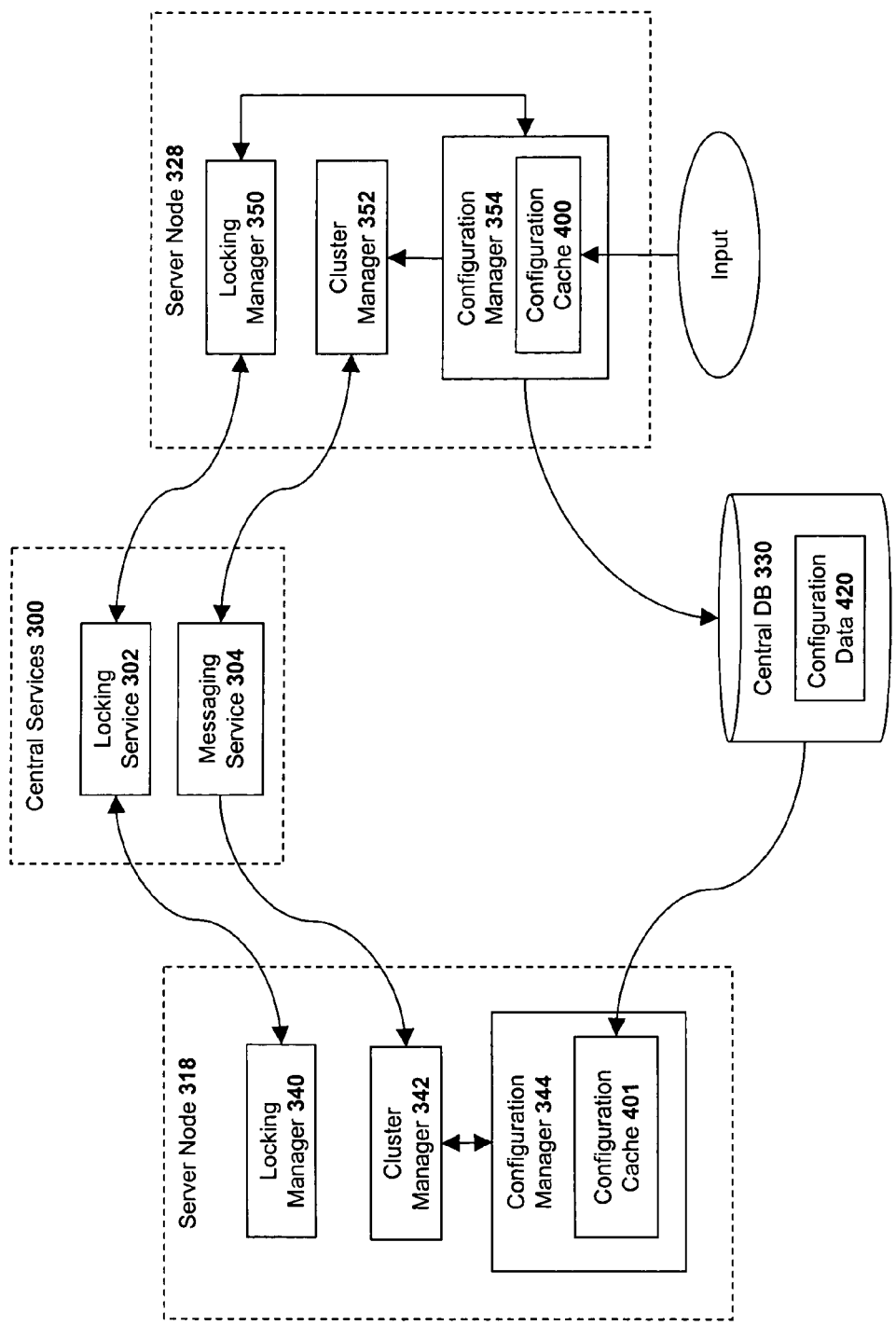
FIG. 4 illustrates one embodiment of the invention in which configuration data is cached across multiple cluster nodes.

Referring now to FIG. 4, in one embodiment, configuration data 420 defining the configuration of the central services instance 300 and/or the server nodes and dispatchers within instances 310 and 320, is stored within the central database 330. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc); information related to the network management configuration for each server/dispatcher (e.g., as described below); and various other types of information related to the cluster.

In one embodiment of the invention, to improve the speed at which the servers and dispatchers access the configuration data, the configuration managers 344, 354 cache configuration data locally within configuration caches 400, 401. As such, to ensure that the configuration data within the configuration caches 400, 401 remains up-to-date, the configuration managers 344, 354 may implement cache synchronization policies.

Figure 5:
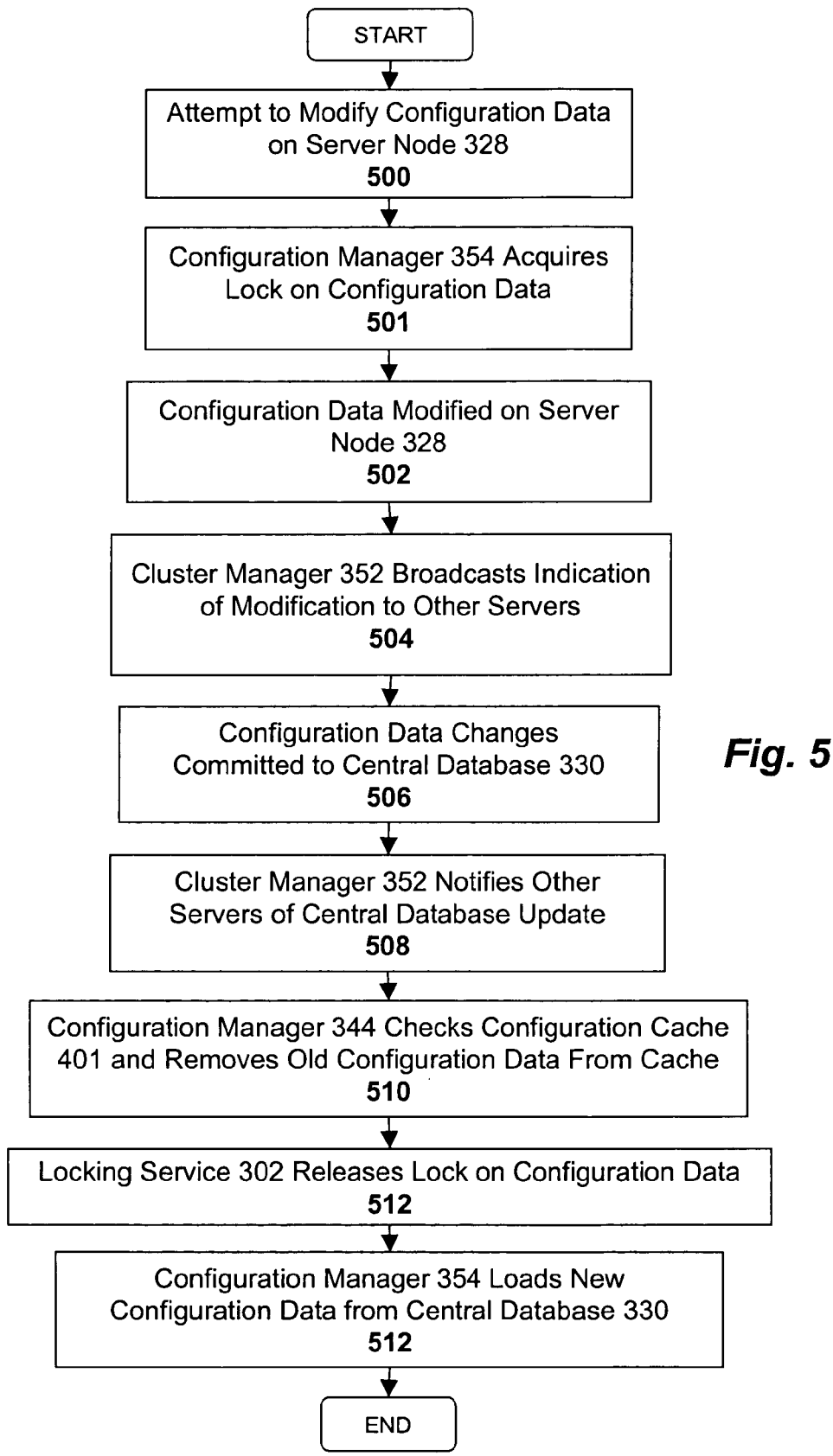
FIG. 5 illustrates a process for maintaining up-to-date configuration data at each of the cluster nodes.

One embodiment of a method for synchronizing configuration data across each of the application server instances 310, 320 and the central services instance 300 is illustrated in FIG. 5. It is assumed initially that certain portions of the configuration data from the central database is cached locally within configuration cache 400 and configuration cache 401.

At 400 (FIG. 4), a user or network administrator attempts to modify the configuration data stored within configuration cache 300 on application server 328. In response, the configuration manager 354 attempts to acquire a lock on the relevant portions of the configuration data by transmitting a lock request to the locking service 302. If the configuration data is not being currently modified by another transaction, then the locking service locks the configuration data on behalf of the configuration manager 354. Once locked, the configuration managers 344 of other server nodes 318 will not be permitted to access or acquire a lock on the configuration data.

At 502, the configuration data within the configuration cache 400 of application server 328 is modified. At 504, the cluster manager 352 broadcasts an indication of the modified data to the cluster manager 342 on server node 318 and the cluster manager of other server nodes (i.e., via the messaging service 304). At 506, the modifications to the configuration data are committed to the central database 330. At 508, the cluster manager 352 notifies the cluster manager 342 on server node 318 and the cluster managers of other server nodes of the central database update. In response, the configuration manager 344 invalidates the modified configuration data from its cache 401 and, at 512, loads the new configuration data from the central database 330. In one embodiment, the configuration manager 344 only downloads the portion of the configuration data which has been modified (i.e., rather than the entire set of configuration data). To determine whether it needs to update its configuration data, the configuration manager 344 compares the version of its configuration data with the version of the configuration data stored the central database.

Embodiments of a Management Architecture

In one embodiment of the invention, a management architecture specifically adapted to a clustered enterprise environment is employed within the application server system described with respect to FIGS. 3-5. Specifically, in one embodiment, each server, dispatcher, and/or central services instance (referred to generally as "nodes") within the system is provided with a dedicated MBean server to register MBeans for monitoring specified system resources.

Virtually any type of system resource may be monitored in this manner including, but not limited to application resources, kernel resources, services, managers, components, interfaces and libraries associated with the individual nodes within the system. By way of example, within a J2EE engine, state information related to memory management, thread management, locking and licensing may be of particular importance. Once collected, this information may be combined and provided in a comprehensive manner to the end user or system administrator.

Figure 6:
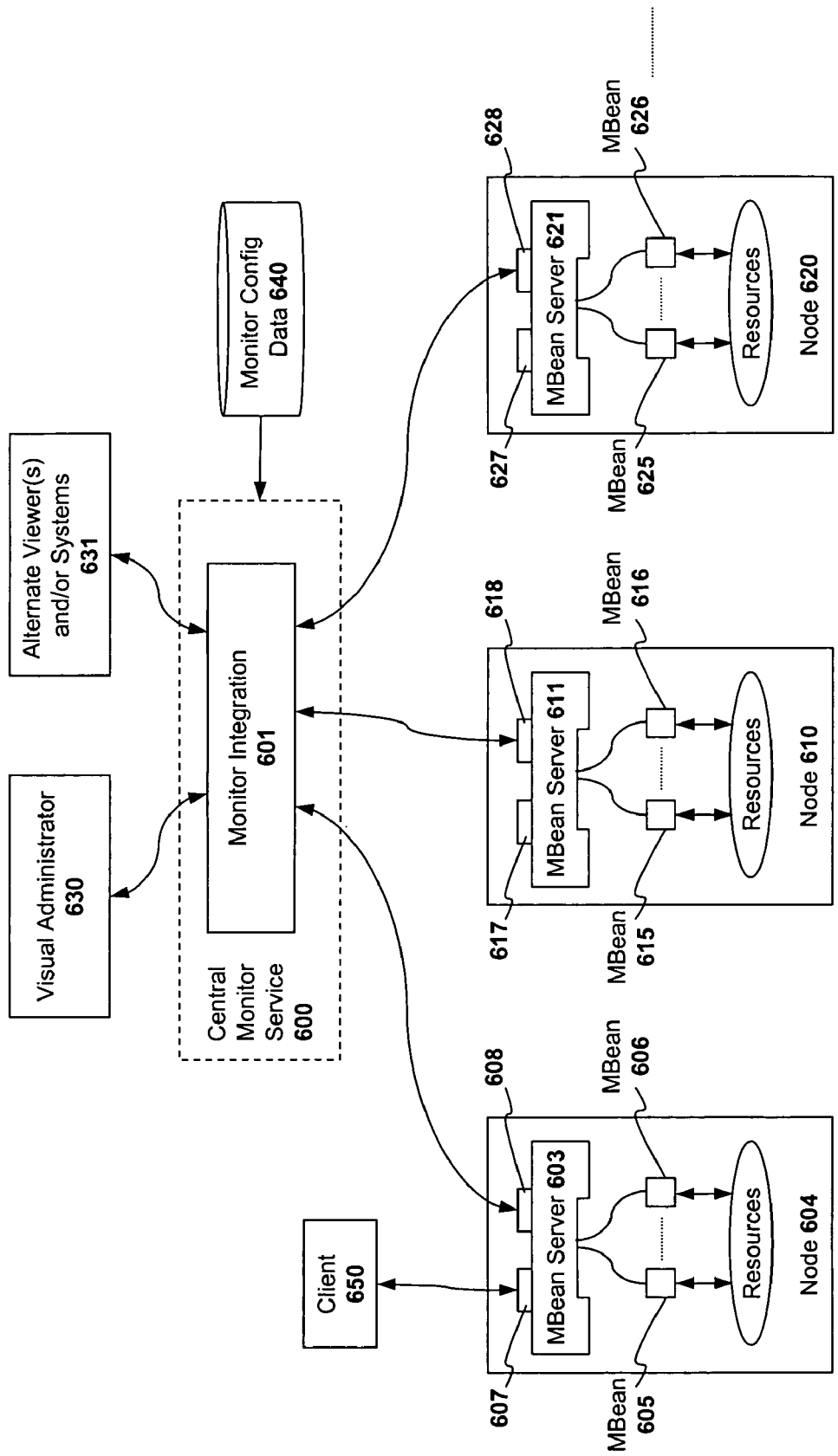
FIG. 6 illustrates a central monitor service with monitor integration logic according to one embodiment of the invention.

FIG. 6 illustrates an exemplary embodiment of the invention in which resource information is monitored on different cluster nodes 604, 610 and 620. The cluster nodes 604, 610 and 620 may represent any of the different types of nodes illustrated in FIGS. 3-4 including, for example, dispatchers 312, server nodes 318 and/or central services nodes 300.

In the illustrated embodiment, separate MBean servers 603, 611, and 621, are executed on each of the nodes 604, 610, and 620, respectively. Different types of MBeans may register with each of the MBean servers to monitor different types of system/node resources. For the purpose of illustration, only two MBeans are shown registered with each MBean server in FIG. 6. Specifically, MBeans 605 and 606 are registered with MBean server 603 on node 604; MBeans 615 and 616 are registered with MBean server 611 on node 610; and MBeans 625 and 626 are registered with MBean server 621 on node 620. It will be appreciated that, in an actual implementation, significantly more MBeans may be registered with each MBean server and a significantly greater number of nodes may be employed on the system.

In one embodiment, a central monitoring service 600 employed within the distributed configuration hides the clusterization of the various MBean servers and provides a unified view of managed resources at the manager level 201. Specifically, monitor integration logic 601 associated with the central monitoring service 600 combines the monitoring data collected from each of the individual MBean servers 603, 611, 621 and generates an comprehensive, logical view of the monitored resources. The monitoring data may then be displayed on a visual administrator 630 and/or any other type of graphical user interface 631 (e.g., such as a standard Web browser). In one embodiment, the integration logic 601 combines the monitoring data based on monitor configuration information 640 (e.g., node layout, monitoring parameters, . . . etc) stored within the central database 330. As described below with respect to FIGS. 8a-b, in one embodiment, the monitor integration logic 601 includes monitor MBeans arranged in a logical monitor tree hierarchy.

The central monitor service 600, clients 650 and/or any other module/object may communicate with the MBean servers 603, 611, 621 via protocol adapters and/or connectors, represented in FIG. 6 as blocks 607, 608, 617, 618, 627, and 628. Protocol adapters and connectors are similar in that they serve the same general purpose—i.e., to expose an MBean server to managing entities. The primary difference between them is how they accomplish this task. Protocol adapters generally listen for incoming messages that are constructed in a particular protocol (e.g., such as like HTTP or SNMP). As such, protocol adapters are comprised of only one component that resides in the MBean server. For example, if client 650 is a browser-equipped client, it may communicate with the MBean server 603 via an HTTP protocol adapter 650.

By contrast, connectors are generally comprised of two components, one which resides on the MBean server and the other which resides on the client-side applications. Thus, connectors hide the underlying protocol being used to contact the MBean server (i.e., the entire process happens between the connector's two components). Throughout this detailed description, it is assumed that communication with an MBean server occurs via a protocol adapter and/or connector of that MBean server, notwithstanding the fact that the protocol adapter/connector may not be explicitly described or illustrated.

Figure 7A:
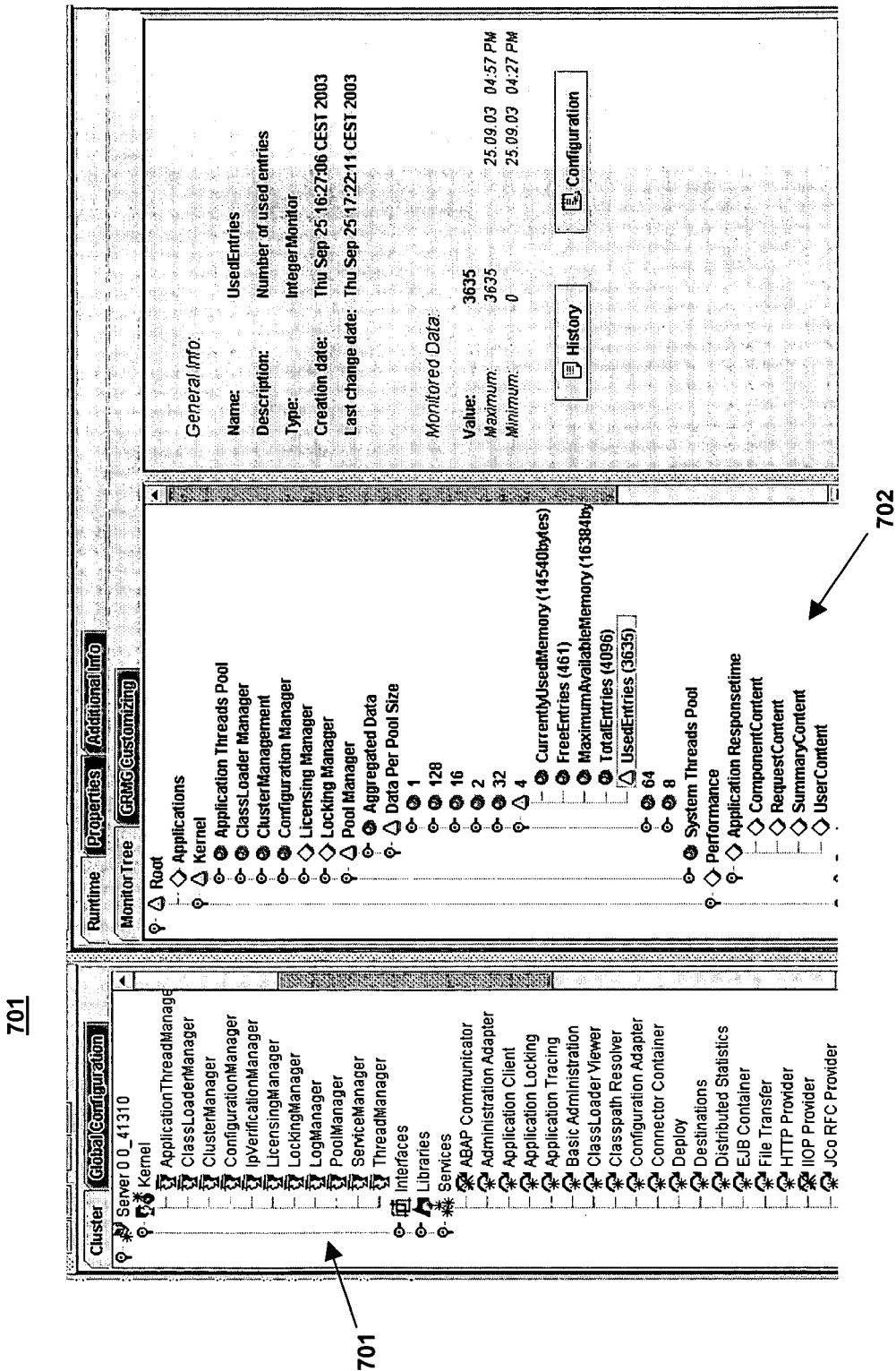
FIGS. 7a-b illustrate a graphical visual administrator used for viewing monitor data according to one embodiment of the invention.

FIG. 7a illustrates an exemplary monitor viewer 700 for navigating through resource information collected and compiled by the central monitoring service 600. The monitor viewer includes a first window 701 containing a hierarchical representation of each system node (e.g., "Server 0 0_41310"). Under each node entry is a set of categories related to that node. For example, entries for "Kernel," "Interfaces," "Libraries" and "Services" are shown under Server 0 0_41301. When a user selects a particular node in the first window 701, a hierarchical monitor tree displays monitor data related to that node in a second window 600. As described below, in one embodiment, the monitor tree is defined in the monitor configuration data 640 as interpreted by the central monitoring service.

Figure 7B:
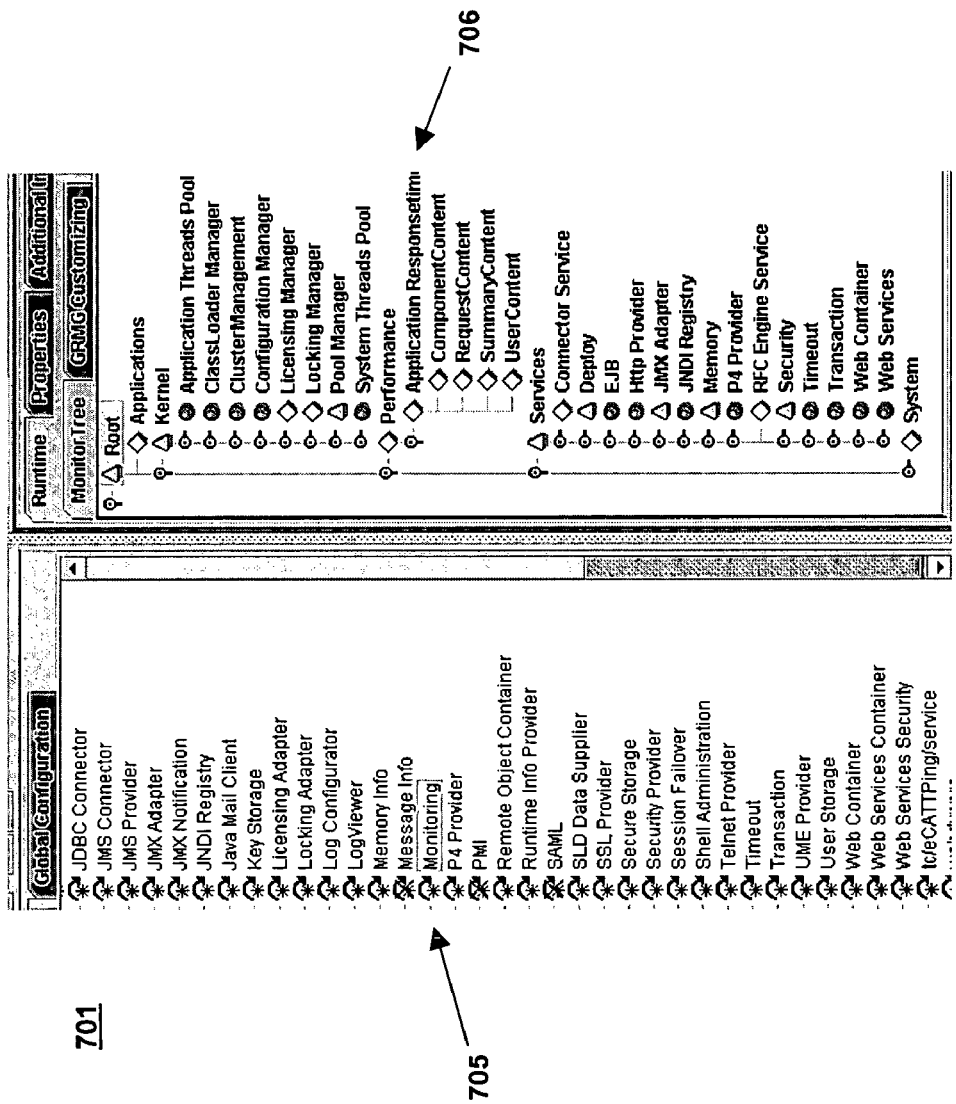

FIG. 7b illustrates another view of the monitor viewer 700 in which a global configuration tab 705 is selected in the first window. As a result, a hierarchical monitor tree 706 containing monitor data related to the entire cluster (i.e., "global" information) is displayed in the second window. Specifically, the monitor tree 706 displays global information related to applications, kernel resources, system performance criteria, and services. It should be noted, of course, that specific types of monitor data are illustrated in FIGS. 7a-b merely for the purpose of illustration. Various other types of cluster-related monitoring data may be compiled and displayed while still complying with the underlying principles of the invention.

As described above, MBeans may be used to represent and provide data related to virtually any type of system resource (e.g., a manager, service, application, . . . etc). In one embodiment of the invention, during runtime, data may either be pulled periodically from the underlying MBean/resource ("passive instrumentation") or, alternatively, the MBean/resource may be configured to push the monitoring data to the monitor service using a specified event mechanism ("active instrumentation").

Figure 8A:
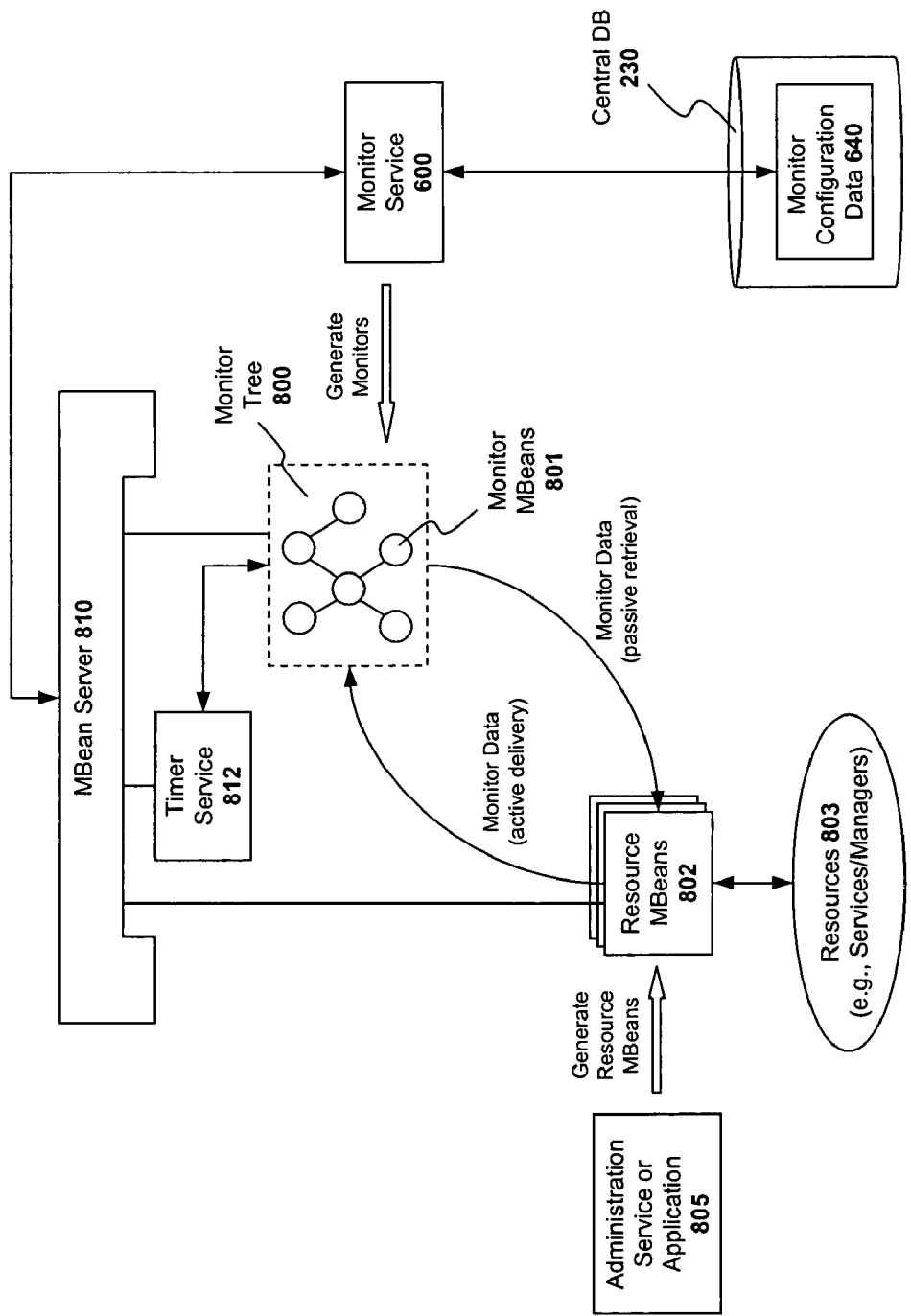
FIG. 8a illustrates a monitoring architecture according to one embodiment of the invention.

One particular embodiment, illustrated in FIG. 8a, employs two different types of MBeans to perform passive and/or active instrumentation functions: resource MBeans 802 (also referred to herein as "runtime" MBeans) and monitor MBeans 801. Resource MBeans, also referred to herein as "runtime" MBeans, are associated with the underlying system resources such as kernel resources, components, libraries, . . . etc. Monitor MBeans are generated by the central monitor service 600 and are mapped to the resource MBeans according to the monitoring configuration data 640 stored within the central database 330.

Figure 8B:
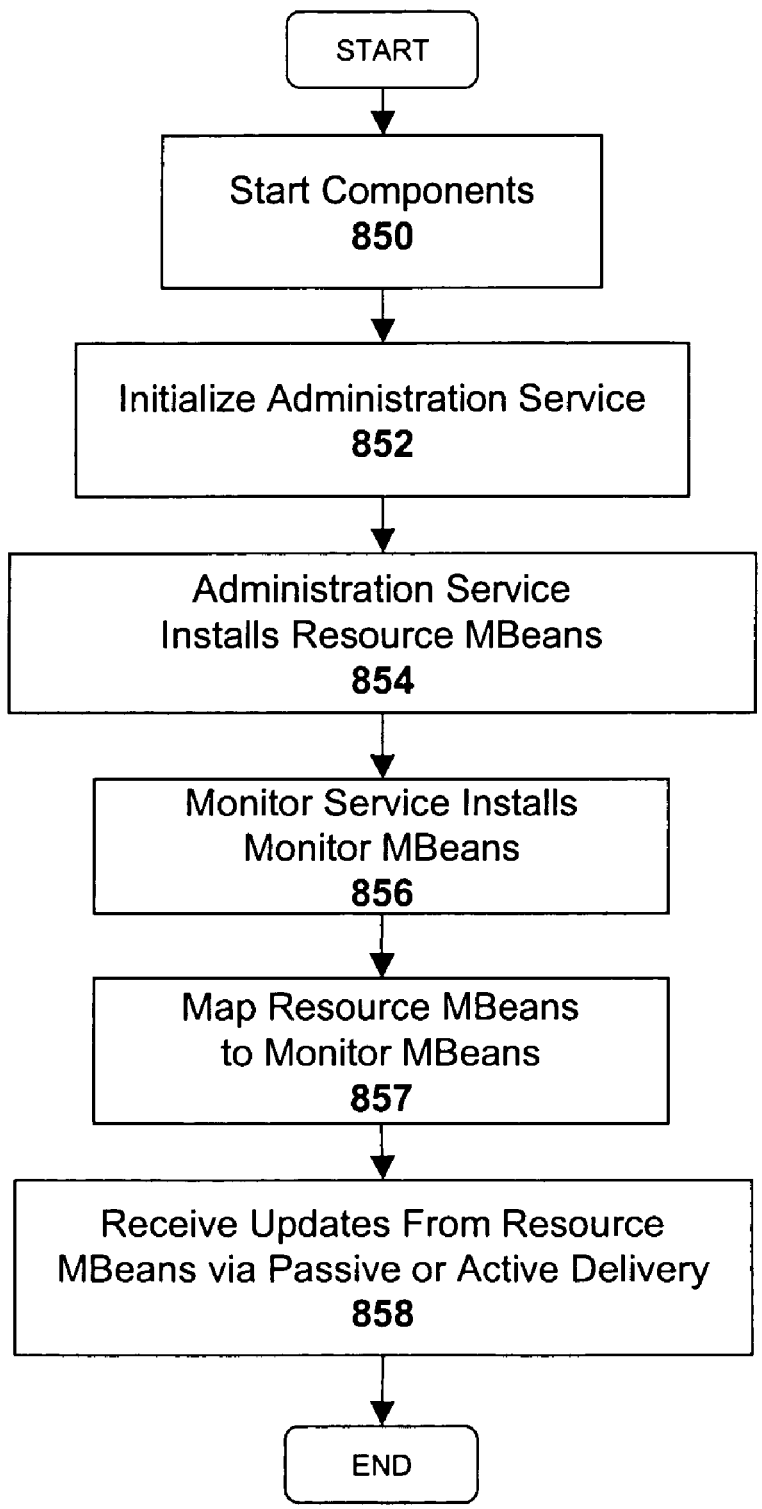
FIG. 8b illustrates one embodiment of a method for starting the monitoring architecture.

FIG. 8b illustrates a monitor initialization process utilized within the architecture of FIG. 8a. At 850, the J2EE components required to run the monitor architecture are started (e.g., the management interfaces). At 852, the components then install/initialize the administration service (or application) 805. The administration service is also illustrated and described below with respect to FIG. 13. At 854, the administration service 805 installs the resource MBeans used to monitor specified resources within each node in the cluster. In one embodiment, the administration service 805 uses the monitor configuration data 640 within the central database 330 to identify the resource MBeans to install. The administration service 805 may communicate with the central monitor service 600 throughout the initialization process to coordinate the retrieval of MBean data form the central database 330 and to coordinate the mapping of resource MBeans to monitor MBeans (as described below).

At 856, the central monitor service 600 installs the monitor MBeans 801 based on the monitor configuration data 640 stored within the central database 330. In one embodiment, the central monitor service 600 arranges the Monitor MBeans 801 within a hierarchical monitor tree 800, representing the logical relationships between the resources in each of the nodes in the cluster. As mentioned above, monitor information from the monitor tree 800 (or subsections thereof) may be displayed within a graphical visual administrator 630 or other user interface.

At 857, resource MBeans 802 are mapped to monitor MBeans 801 within the monitor tree 800, thereby establishing a link between each monitor MBean and the resource which it represents. For example, each monitor MBean 801 within the monitor tree 800 may have a resource identifier associated therewith, identifying the resource (or resource MBean) which it represents. Once the mapping is complete, the monitoring architecture is executed and, at 858, monitor updates are provided from the resource MBeans to their associated monitor MBeans. The monitor updates may then be displayed as a monitor tree within the visual administrator 630.

As mentioned above, different types of monitor updates may be employed within the system. By way of example, and not limitation, this may include string monitors which monitor text as a string value; integer monitors which monitor an 'int' value; table monitors which monitor a table containing a header and contents (e.g., wherein each header element is a string and each table element is a serializable object); state monitors which are similar to string monitors but have the additional property of assigning colors (e.g., green, yellow, red) to the string values (e.g., for indicating the state of the associated resource within the visual administrator); availability monitors which monitor a boolean value indicating whether the resource is available; frequency monitors which compute a frequency according to reported number of events given at specific times; quality rate monitors which compute an average (and actual) quality rate according to reported number of total tries and successful tries (e.g., one successful try from a total amount of 10 tries would result in a quality rate of 10%); pool monitors which monitor a pool characterized by (a) configurable values for minimum/maximum pool size, initial pool size and increment size when increasing the pool, and (b) runtime values for the number of current used objects and current pool size; and cache monitors which monitor a cache characterized by a configurable maximum cache size and/or the number of current used objects. It should be noted, however, that the foregoing examples are for the purpose of illustration only. The underlying principles of the invention are not limited to any particular monitor types.

In addition, as mentioned above, resource data may either be pulled periodically from the underlying resource MBean ("passive instrumentation") or, alternatively, the resource MBean may be configured to push the monitoring data to the monitor service using a specified event mechanism ("active instrumentation"). Different examples of resource data transmission are described below with respect to FIGS. 9a-c.

Figure 9A:
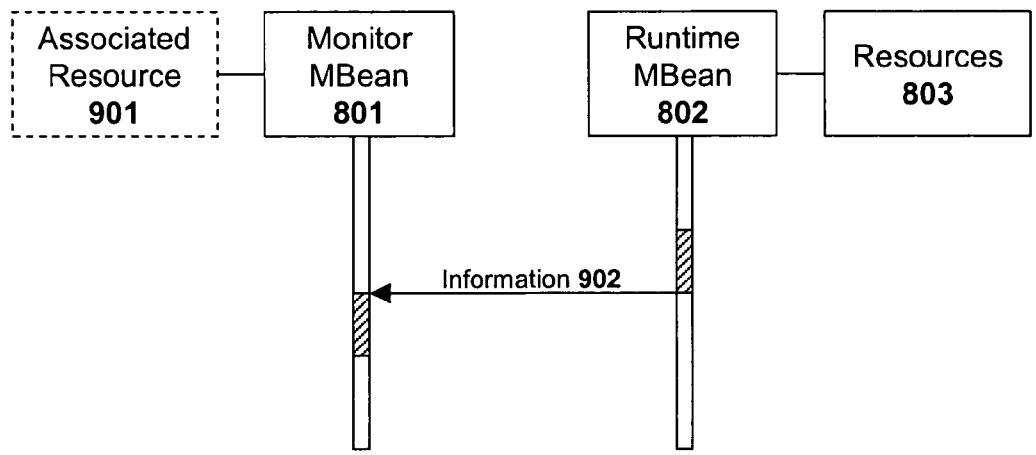
FIGS. 9a-c illustrate different data delivery paradigms employed in different embodiments of the invention.

FIG. 9a illustrates one embodiment of an "active" or "push" data delivery paradigm in which a runtime MBean 802 actively transmits monitoring data related to the resource 803 with which it is associated, without first receiving a request from the monitor MBean. For example, the runtime MBean 802 may transmit updates periodically and/or when the monitored value of the resource 803 changes by a specified amount (e.g., when it reaches a specified threshold).

Figure 9B:
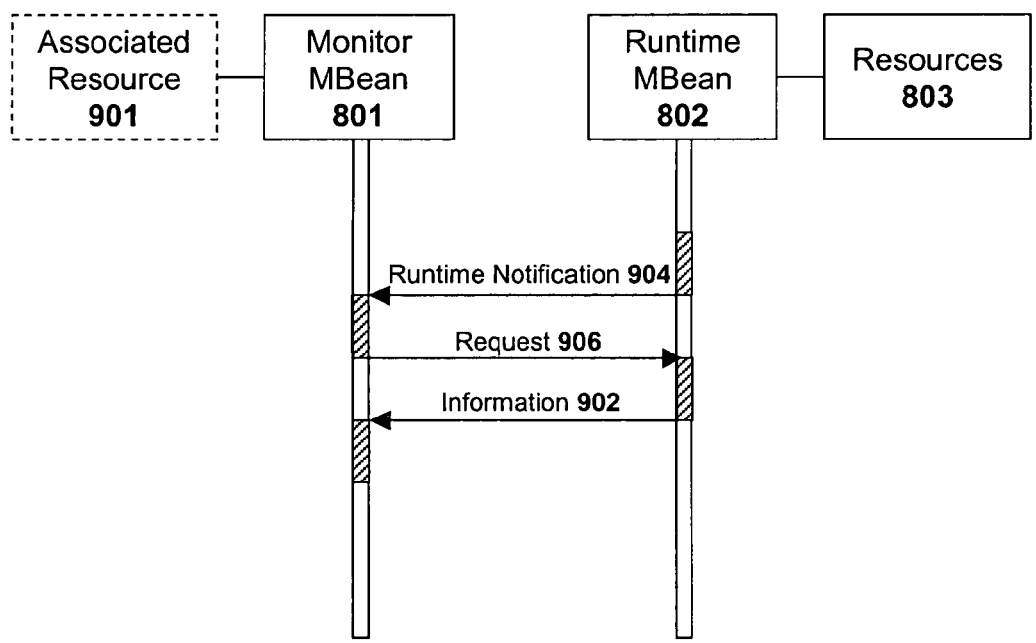

BY contrast, FIG. 9b illustrates an embodiment in which the runtime MBean 802 transmits a runtime notification 904 to the monitor bean 716, thereby notifying the monitor MBean that new monitoring data is related to the associated resource 901 is available. Upon receiving the notification 904 from the runtime MBean 802, the monitor bean 801 may send a request 906 to the runtime MBean 802 requesting the new monitoring data. In response, the runtime MBean 802 transmits the information 902 including monitoring data regarding the associated resource 901 to the monitor MBean 801.

Figure 9C:
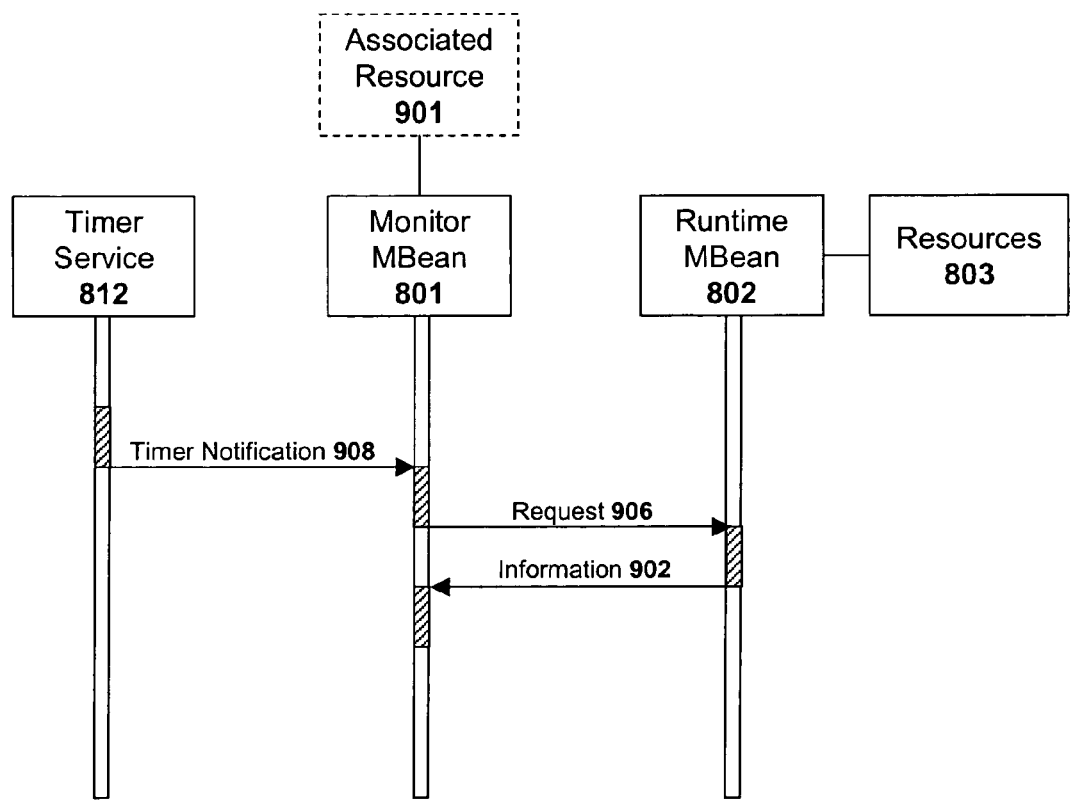

FIG. 9c illustrates an embodiment of a "passive" or "pull" paradigm in which the resource MBean 802 transmits information 902 related to its resource 803 in response to a request 906 from the monitor MBean 801. In addition, in this embodiment, the monitoring data transmission sequence may be controlled via a timer service 812 associated with the MBean server 810. For example, the timing service 812 may be programmed to trigger the monitor MBean request 906 periodically (e.g., every few seconds).

Figure 10:
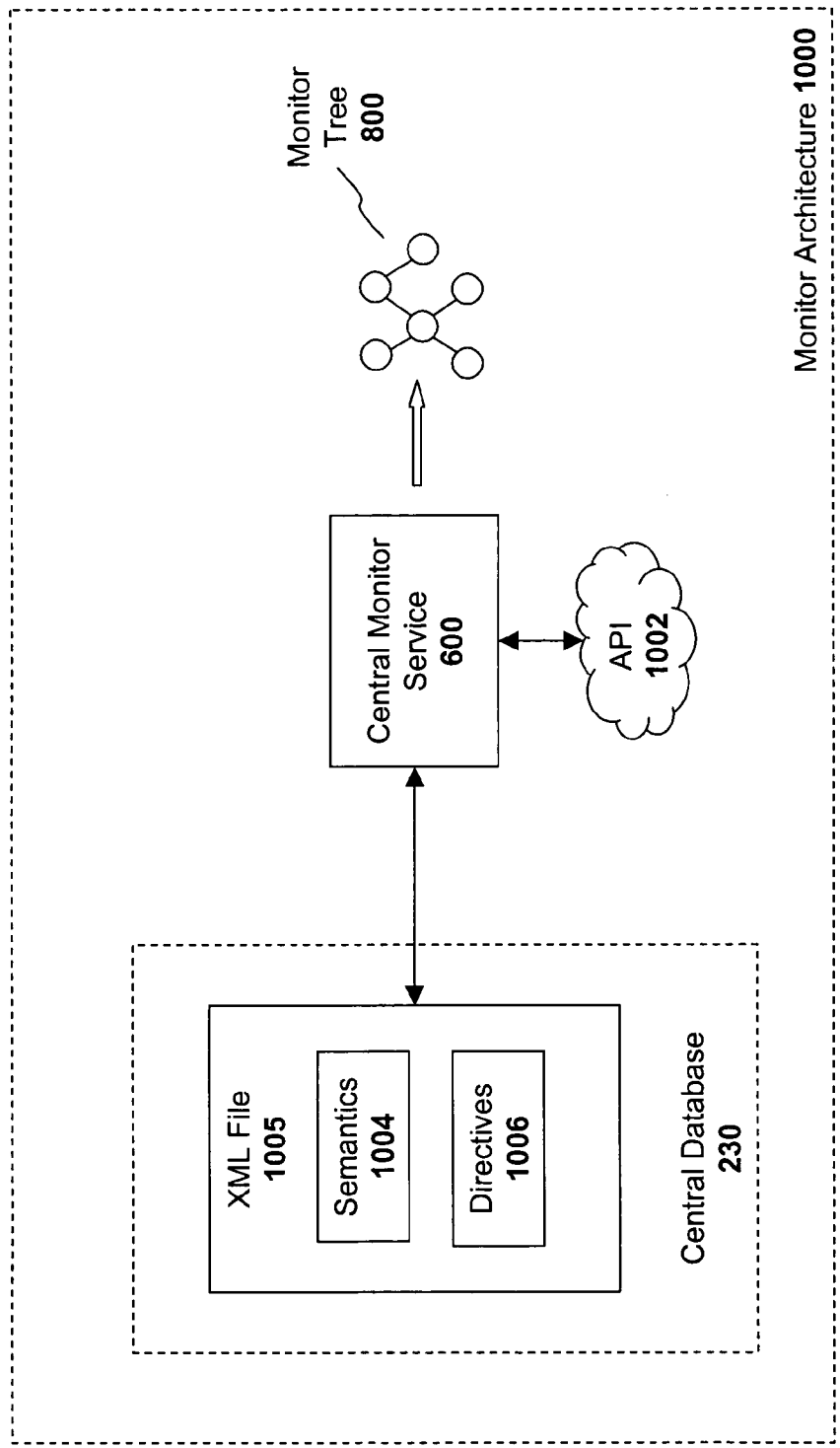
FIGS. 10-11 illustrate embodiments of the invention in which the monitor configuration data is stored within an extensible markup language ("XML") file.

FIG. 10 illustrates an embodiment in which the monitor configuration data 640 is stored in an Extensible Markup Language ("XML") format. According to this embodiment, the central monitor service 600 of the monitoring architecture 1000 generates a monitor tree 800 based on the semantics 1004 and directives 1006 of an XML file 1005 stored within the central database 230.

In one embodiment, the XML technology is integrated with a Java 2 Platform Enterprise Edition (J2EE) engine for electronic data interchange, and due to XML's characteristics of being broad and relatively easy to use. To support and build the XML technology, including the XML file 1005, in the J2EE engine, application programming interfaces ("APIs") 1002 may be employed to use the XML file 1005 to configure various components and application modules. For example, the XML file 1005 may be used to facilitate components and modules of the monitor service 600 to generate the monitor tree 800.

According to one embodiment, the API 1002 may is a Java-compliant API. Examples of Java APIs include the J2EE XML API, Java API for XML Processing ("JAXP"), Java Messaging Service ("JMS") API, Java API for XML Messaging ("JAXM"), Java Transaction API ("JTA"), Java API for XML-Remote Procedure Call ("JAX-RPC"), Java API XML Binding ("JAXB"), and Java API for XML Registries ("JAXR"), to name a few. The API 1002 may facilitate both the creation and customization of the monitor tree 800 as well as the reporting of the monitoring information and values. Multiple XML files may be used and similarly, multiple API may be used to generate the monitor tree 800.

As mentioned above, the XML file 1005 may include semantics 1004 and directives 1006 used by the monitor service 600 to generate the monitor tree 800. The semantics 1004 of the XML file 1005 comprises the primary information about the monitor tree 800, the monitor MBeans (monitor beans), and the resources to be monitored by each of the MBeans. The semantics 1004 include a code or a set of instructions for generating the monitor tree 800. The set of instructions may include, for example, the instructions for setting color-coded marks representing corresponding status of the resources within the visual administrator 630 or other graphical interface or system 631 (e.g., within the displayed monitor tree). For example, in one embodiment, a green mark indicates monitoring of the corresponding resource; a yellow mark indicates continuous monitoring of the corresponding resource, and may also indicate that the resource being monitored may be reaching a critical value or stage; and a red mark indicates that the corresponding resource may have reached a critical value. Finally, a white mark may indicate inactivity, or that the corresponding resource is not being monitored. Of course, the underlying principles of the invention are not limited to any particular set of color-coded marks.

According to one embodiment, the directives 1006 specify the form in which the monitor tree 800 is generated. Stated differently, the directives 1006 provide installation instructions on how the semantics 1004 are to be implemented. For example, the directives 1006 may include one or more templates to match various monitor beans with corresponding associated resources at various nodes of the monitor tree 800.

The monitor service 600 employs the API 1002 to generate the monitor tree 800 based on the semantics 1004 and the directives 1006.

The semantics 1004 and the directives 1006 of the XML file 1005 may include elements (e.g., similar to HyperText Markup Language ("HTML") tags) to provide context to the information contained within the XML file 1005. The XML file 1005 may be document-centric to be used by humans or data-centric to be used by another software application or module containing data extracted from a database, such as the central database 230, and may be submitted to the API 1002.

Figure 11:
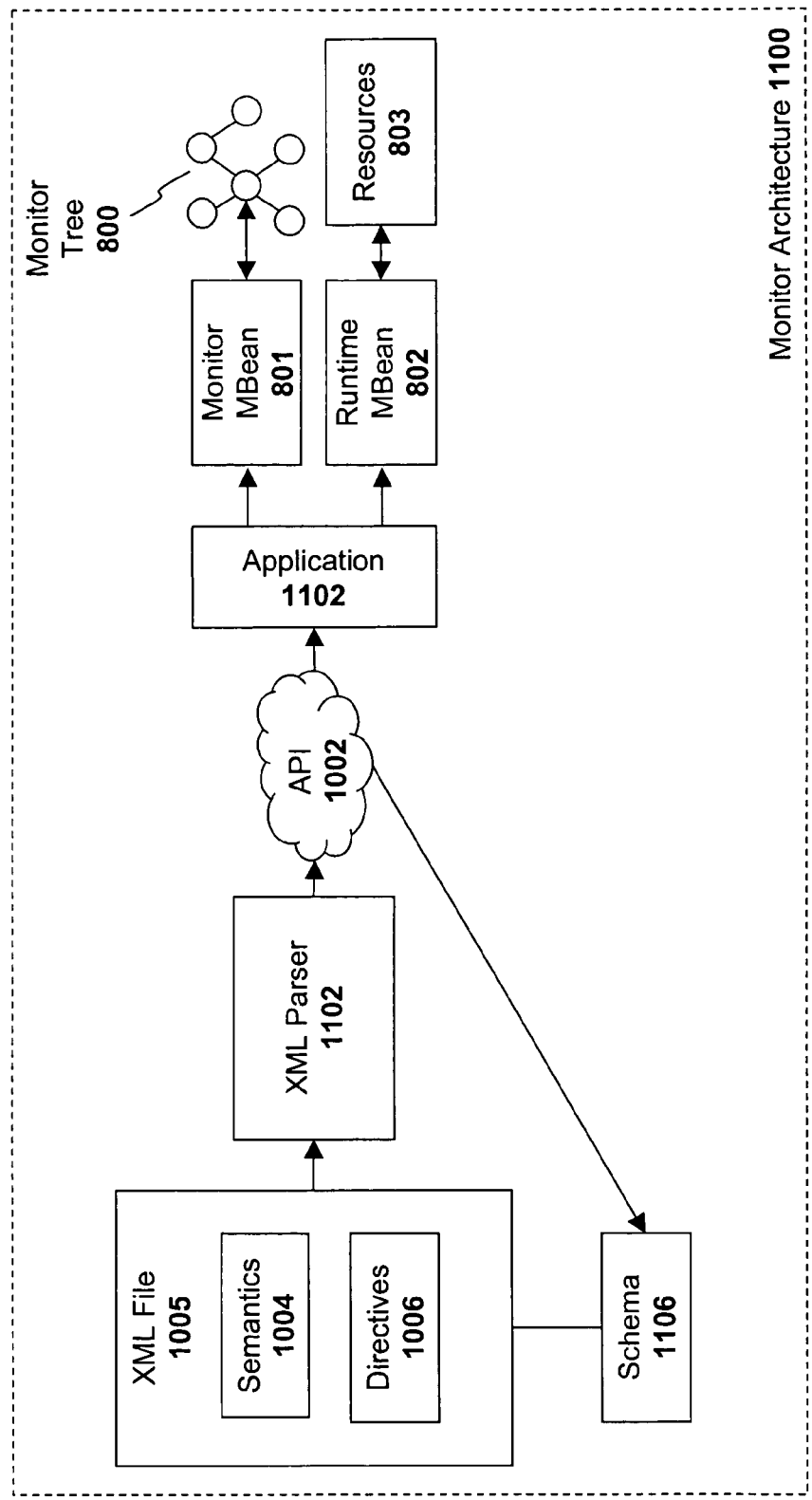

FIG. 11 illustrates additional details associated with the interpretation of the XML file 1005. The semantics 1004, the directives 1006, and other components of the XML file 1005 may be parsed using an application known as the XML parser (or XML processor) 1102. The XML file 1005 and the schema (or scheme or plan) 1106, if any, associated with the XML file 1005 may be interpreted by the XML parser 1102 for parsing of the semantics 1004 and directives 1006 contained in the XML file 1005, and for organizing, formatting, and validating of the information.

The XML parser 1102 may provide an application 1104 (or other type of software module) with access to the elements of the XML file 1005 to establish a link between the XML file 1005 and other components or modules, such as the application programming interface ("API") 1002, of the monitoring architecture 1100. For example, the API 1002 and the XML parser 1102 may be used to generate the monitor tree 800 (e.g., by assigning the various monitor MBeans 801 to their associated resources at various nodes within the monitor tree 800). According to one embodiment, for the purposes of customizing the monitor tree 800, the API 1002 may include a bootstrapper which includes a code or a sequence of codes to initiate relationships between component agents and the MBeans 801. Customizing of the monitor tree 800 may include establishing values (e.g., thresholds, descriptions, ... etc) that may be registered along with each monitor MBean 801.

The XML file 1005 may be parsed in several ways including using the Document Object Model ("DOM"), which reads the entire XML file 1005 and forms a tree structure, or using the Simple API for XML ("SAX"), which is regarded as an event-driven parser that reads the XML file 1005 in segments. The API 1002 may be a Java Management Extensions (JMX)-based API. Examples of Java or JMX-based APIs include J2EE XML API, Java API for XML Processing ("JAXP"), Java Messaging Service ("JMS") API, Java API for XML Messaging ("JAXM"), Java Transaction API ("JTA"), Java API for XML-Remote Procedure Call ("JAX-RPC"), Java API XML Binding ("JAXB"), and Java API for XML Registries ("JAXR").

As described above with respect to FIG. 9a, runtime MBeans 802 may be configured to actively transmit monitoring information related to the resource 803 with which they are associated. In addition, one embodiment illustrated in FIG. 12, employs a notification service 1201 to provide a comprehensive view of all of the notifications generated by the runtime MBeans across the entire cluster. For example, certain MBeans may be configured to generate active "notifications" to the notification service 1201 on certain specified events such as start/stop, get/set properties, etc, of their associated resources. The notification service 1201 then provides a cluster-wide indication of these specified events to any visual administrator (or other type of client) coupled to any node within the cluster. Two different users connected via two different machines may use the notification service to view a comprehensive, up-to-date state of the system.

Figure 12:
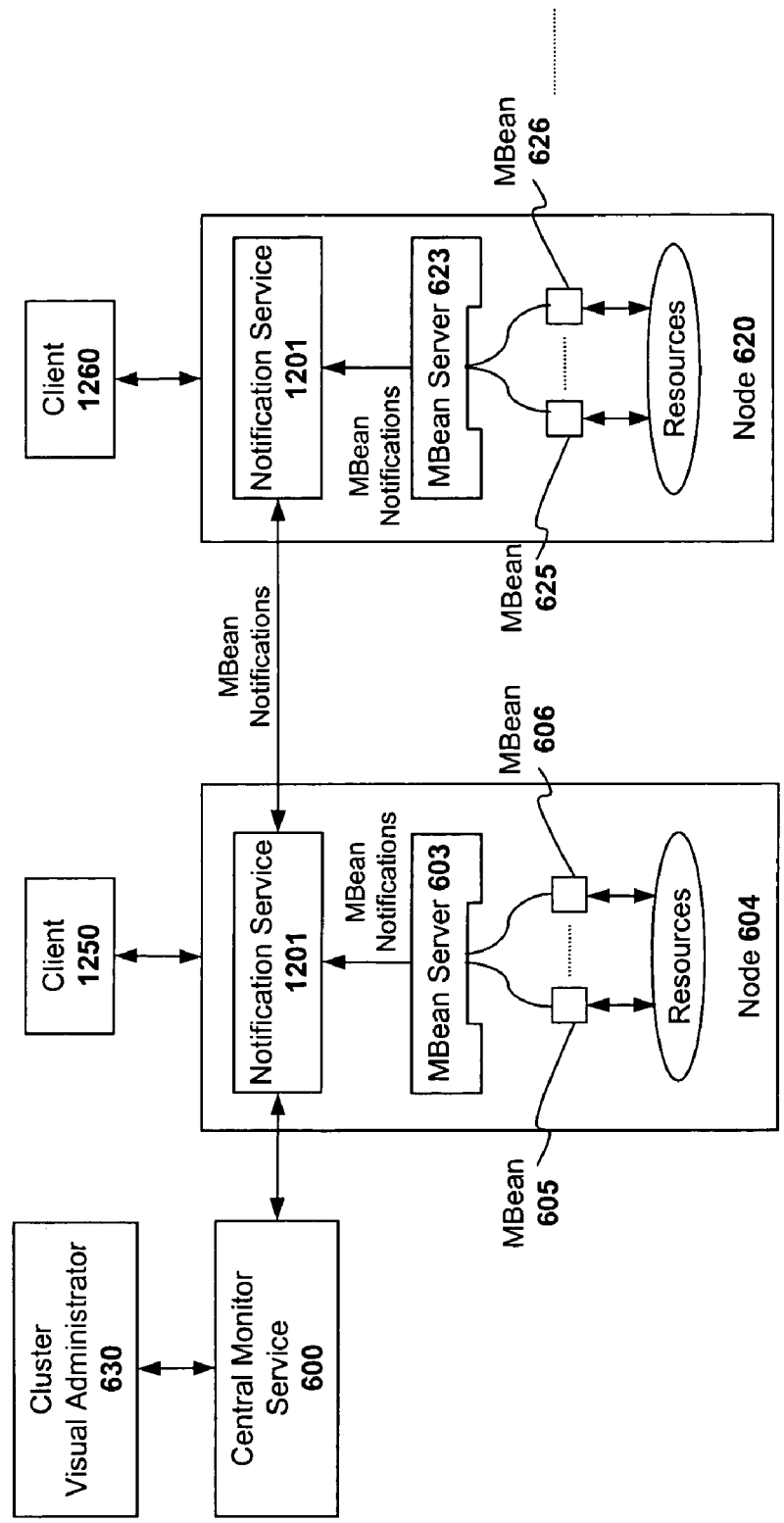
FIG. 12 illustrates a notification service employed in one embodiment of the invention to provide active cluster-wide notification updates.

Thus, referring to the specific example illustrated in FIG. 12, MBean 625 may be configured to generate active notifications in response to certain specified events. In response to detecting one of the events, the MBean 625 generates a notification which is received by the notification service 1201 (i.e., via MBean server 623). The notification service 1201 then communicates the MBean notification to all other nodes within the cluster and provides the notification to any objects that are registered with the notification service 1201 as listeners. Accordingly, the notification will be viewable from client 1250 coupled directly to node 604, as well as client 1260, coupled directly to the node on which the notification was generated. In other words, a single, unified view of cluster-wide notifications is available from any of the nodes in the cluster. In one embodiment, the notification service 1201 utilizes the message passing architecture provided via the central services instance 300 shown in FIG. 3 to enable cluster-wide communication of MBean notifications (e.g., by exchanging notifications via the messaging service 304).

Notifications may take on various forms while still complying with the underlying principles of the invention. In one embodiment, each notification will have a time stamp, sequence number, and a human-readable message indicating the type of notification, and the reason for the notification (e.g., a particular threshold value was reached, a resource went offline, ... etc).

In one embodiment, a notification application programming interface is defined to enable use of notifications. For example, a "Notification Broadcaster" class may be employed for notification generators (e.g., MBean 625 in the previous example). In addition, a "Notification Listener" class may be employed for any objects interested in receiving notifications. In one embodiment, a "Notification Filter" class may also be defined for filtering out certain types of notifications (e.g., on behalf of certain specified Notification Listeners).

Figure 13:
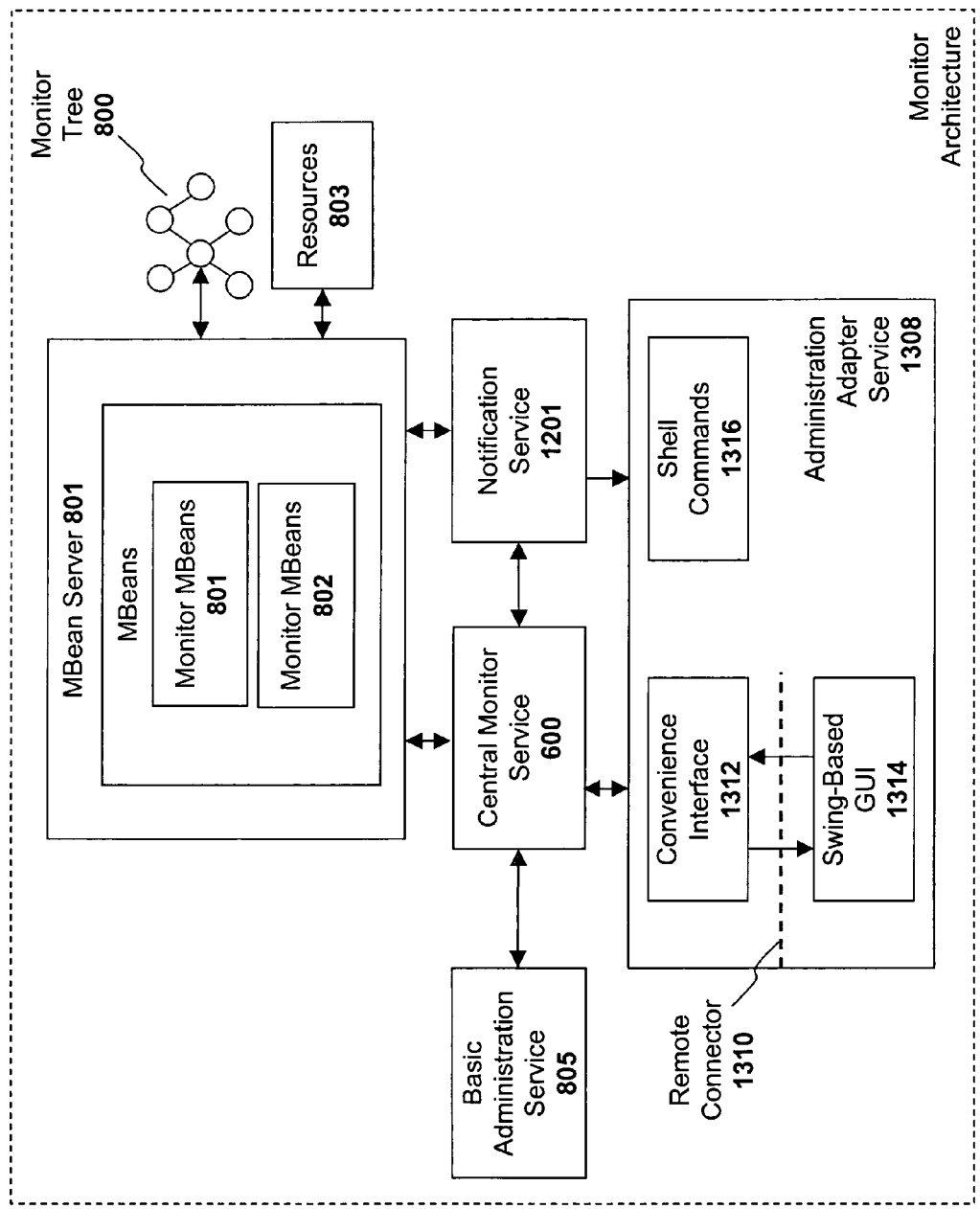
FIG. 13 illustrates an embodiment of the invention which includes a plurality of different management/monitoring services.

FIG. 13 illustrates a group of services for performing resource monitoring functions according to one embodiment of the invention. In addition to the monitor service 600 and notification service 1201, the illustrated monitoring architecture includes a basic administration service (<basicadmin> or administration service) 805 and an administration adapter service (<adminadapter> or adapter service) 1308.

As described above with respect to FIGS. 8a-b, the administration service 805 provides instrumentation of certain modules and components (e.g., libraries and interfaces) and also facilitates registration of MBeans with the MBean server 810 via the monitor service 600. Recall that monitor MBeans 801 registered with the MBean server 810 represent individual tree nodes (nodes) of the monitor tree 800. Each of the monitor MBeans 801 may be used, for example, for reboot and shutdown, as well as for defining the type of nodes (e.g., dispatcher or server type nodes) and the resources associated with each of the nodes, for which monitoring information may be retrieved from runtime MBeans 802. The runtime MBeans 802 may be used for monitoring of all clusters and associated resources 803.

In one embodiment, the administration service 805 provides for registration of two logical types of MBeans: standard MBeans and specific beans. Standard MBeans may provide standard functionality of start/stop and get/set properties of their associated resources. Standard MBeans may be registered by default for all deployed components or resources (e.g., kernel, libraries, interfaces, services, etc). By contrast, specific beans may provide component-specific functionalities that may vary from one component to another. To have specific beans, a component may register an object that may implement a specific interface to list the processes available for its management and to extend the management interface (e.g., "com.company.engine.frame.state.ManagementInterface").

For kernel resources, a standard bean may be registered with each manager having a specific bean. A prerequisite for this may be to return a non-null value in a method (e.g., getManagementInterface( )) from the manager interface. For libraries and interfaces, only standard beans may be registered. For services, except for the already registered standard beans, each of the services may register specific beans, and implementation of the management interface may also cause a specific bean to be registered for that particular service.

The adapter service 1308 employed in one embodiment of the invention is part of the manager level 201 of the monitoring architecture (see, e.g., FIG. 2). In one embodiment, the adapter service 1308 includes (1) a remote connector 1310; (2) a "convenience" interface 1312; (3) a "swing-based" Graphical User Interface ("GUI") 1314; and (4) a shell command interface 1316. The adapter service 1308 provides remote access to the MBean server 810 via The remote connector 1310. For example, users may connect from a remote client and view monitoring information relating to monitored resources 803 via the remote connector 1310. Moreover, when used in conjunction with the notification service 1201, users will be provided with a comprehensive view of monitoring data from the entire cluster, as described above with respect to FIG. 13.

The convenience interface 1312 may allow users to remotely access the MBean server 810 using remote administration tools. Remotely accessing the MBean server 810 may include remotely accessing and working with the MBeans as registered by the administration service 805 based on the semantics of the resources 803 that are instrumented and monitored by the MBeans. Stated differently, the adapter service 1308 provides a high-level view of the MBean server 810 and all other MBean servers within the cluster (e.g., as represented by the monitor tree 800). This higher level view may be represented by a monitor tree, the root of which is an MBean that instruments the cluster. The adapter service 1308 may interpret the monitor tree 800 and provide interfaces for managing each type of node within the monitor tree 800. Various different node types may be defined. By way of example, the node types within the monitor tree may include a root node representing the cluster ("TYPE_CLUSTER_MBEAN"), a basic cluster node type representing a node within the cluster ("TYPE_CLUSTER_NODE_MBEAN"), a standard MBean that instruments the kernel of a cluster node ("TYPE_KERNEL_MBEAN"), a standard MBean that instruments a service ("TYPE_SERVICE_MBEAN"), a standard MBean that instruments a library ("TYPE_LIBRARY_MBEAN"), a standard MBean that instruments an interface ("TYPE_INTERFACE_MBEAN"), a standard MBean that instruments a defined group of clusters ("TYPE_GROUP"), and all other MBeans ("TYPE_UNSPECIFIED_MBEAN"). It should be noted, however, that the underlying principles of the invention are not limited to any particular set of MBean types.

The swing-based GUI 1314 employed in one embodiment of the invention may use the convenience interface 1312 and the monitor tree 800 to represent the management functionality of the monitoring architecture to a network administrator or end user. The console counterpart of the GUI administrator may consist of various shell commands 1316 that may be grouped together in an administration command group.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments of the invention described above focus on a JMX implementation within a J2EE environment, certain underlying principles of the invention are not limited to any particular specification. For example, the invention may be implemented within the context of other object-oriented and non-object-oriented programming environments, and may also be employed within future releases of the Java standard, or other standards (e.g., Microsoft's .NET standard).

Accordingly, the scope and spirit of the invention should be judged in terms of the claims which follow.

What is claimed is:

1. A monitoring system comprising:
a cluster of multiple application server instances wherein each said application server instance includes a plurality of server nodes, and a central services instance communicatively coupled to said plurality of server nodes on a multi-tiered network, wherein at least one of the server nodes is dedicated for presentation logic and at least one of the other server nodes is dedicated for business logic wherein the presentation logic and business logic are logically separated from a user application instance executing on a client, the application server instances to serve applications over the multi-tiered network to a plurality of clients, wherein the central services instance is to provide messaging and synchronization services between the server nodes in the cluster;
a central database in the central services instance storing program code and configuration information for the application server instances;
a plurality of MBean servers assigned to the plurality of server nodes;
a plurality of runtime MBeans associated with specified resources on each of the plurality of server nodes and registered with one of the MBean servers, each of the runtime MBeans collecting and reporting monitoring data for its associated resource; and
cluster integration logic in the central services instance, the cluster integration logic including a plurality of monitor MBeans arranged in a hierarchical tree structure, each of the monitor MBeans associated with at least one of the runtime MBeans, each of the monitor MBeans to receive resource data from its associated runtime MBean, the cluster integration logic to compile the resource data collected from each of the individual runtime MBeans via the MBean servers throughout the cluster and to provide the compiled resource data in a predefined organizational structure to a management interface to provide a unified view of the managed resources in the cluster to an administrator, the predefined organizational structure being a monitor tree representing a hierarchical relationship between each of the resources monitored by each of the MBeans.

2. The system as in claim 1 further comprising: a management interface to display the resource data in a graphical structure representing at least a portion of the hierarchical tree structure.

3. The system as in claim 1 further comprising: a monitor service to generate the monitor MBeans responsive to monitor configuration data.

4. The system as in claim 3 further comprising: a central database to store the monitor configuration data.

5. The system as in claim 1 further comprising: a connector associated with each MBean server to communicatively couple each MBean server to the cluster integration logic.

6. The system as in claim 1 wherein the cluster integration logic provides the compiled resource data to the administrator via a swing-based graphical user interface (GUI) to enable remote administration of the cluster.

7. A method comprising:
communicatively coupling a plurality of server nodes via an application server instance that is part of a cluster, the cluster having multiple application server instances wherein each said application server instance includes a plurality of server nodes, and a central services instance communicatively coupled to said plurality of server nodes on a multi-tiered network, wherein at least one of the server nodes is dedicated for presentation logic and at least one of the other server nodes is dedicated for business logic wherein the presentation logic and business logic are logically separated from a user application instance executing on a client, the application server instances to serve applications over the multi-tiered network to a plurality of clients, wherein the central services instance is to provide messaging and synchronization services between the server nodes in the cluster, wherein the central services instance includes a central database for storing program code and configuration information for the application server instances;
assigning a dedicated MBean server to each of the plurality of server nodes;
associating a plurality of runtime MBeans with specified resources on each of the plurality of server nodes and registering the MBeans with one of the individual MBean servers, each of the runtime MBeans collecting and reporting monitoring data for its associated resource; and
integrating the resource data collected from each of the individual runtime MBeans and providing the integrated resource data to a management interface according to a predefined organizational structure, wherein integrating the resource data and providing the integrated resource data are performed with cluster integration logic in the central services instance, the cluster integration logic including a plurality of monitor MBeans arranged in a hierarchical tree structure, each of the monitor MBeans associated with at least one of the runtime MBeans, each of the monitor MBeans to receive resource data from its associated runtime MBean, and wherein providing the integrated resource data comprises providing a unified view of the managed resources in the cluster to an administrator, the predefined organizational structure being a monitor tree representing a hierarchical relationship between each of the resources monitored by each of the MBeans.

8. The method as in claim 7 further comprising: displaying the resource data in a graphical structure representing at least a portion of the hierarchical tree structure.

9. The method as in claim 7 further comprising: generating the monitor MBeans responsive to monitor configuration data stored within a central database.

10. The method as in claim 7 further comprising: communicatively coupling each MBean server to the cluster integration logic via a connector.

11. The method as in claim 7 wherein the cluster integration logic provides the compiled resource data to the administrator via a swing-based graphical user interface (GUI) to enable remote administration of the cluster.

12. An article of manufacture comprising a machine-readable storage medium including machine-executable instructions stored thereon which, when executed by a machine, causes the machine to perform the operations of:
communicatively coupling a plurality of server nodes via an application server instance that is part of a cluster, the cluster having multiple application server instances wherein each said application server instance includes a plurality of server nodes, and a central services instance communicatively coupled to said plurality of server nodes on a multi-tiered network, wherein at least one of the server nodes is dedicated for presentation logic and at least one of the other server nodes is dedicated for business logic wherein the presentation logic and business logic are logically separated from a user application instance executing on a client, the application server instances to serve applications over the multi-tiered network to a plurality of clients, wherein the central services instance is to provide messaging and synchronization services between the server nodes in the cluster, wherein the central services instance includes a central database for storing program code and configuration information for the application server instances;
assigning a dedicated MBean server to each of the plurality of server nodes;
associating a plurality of runtime MBeans with specified resources on each of the plurality of server nodes and registering the MBeans with one of the individual MBean servers, each of the runtime MBeans collecting and reporting monitoring data for its associated resource; and
integrating the resource data collected from each of the individual runtime MBeans and providing the integrated resource data to a management interface according to a predefined organizational structure, wherein integrating the resource data and providing the integrated resource data are performed with cluster integration logic in the central services instance, the cluster integration logic including a plurality of monitor MBeans arranged in a hierarchical tree structure, each of the monitor MBeans associated with at least one of the runtime MBeans, each of the monitor MBeans to receive resource data from its associated runtime MBean, and wherein providing the integrated resource data comprises providing a unified view of the managed resources in the cluster to an administrator, the predefined organizational structure being a monitor tree representing a hierarchical relationship between each of the resources monitored by each of the MBeans.

13. The article of manufacture as in claim 12 comprising additional program code to cause said machine to perform the operations of:

displaying the resource data in a graphical structure representing at least a portion of the hierarchical tree structure.

14. The article of manufacture as in claim 12 further comprising: generating the monitor MBeans responsive to monitor configuration data stored within a central database.

15. The article of manufacture as in claim 12 further comprising: communicatively coupling each MBean server to the cluster integration logic via a connector.

16. The article of manufacture as in claim 12 wherein the cluster integration logic provides the compiled resource data to the administrator via a swing-based graphical user interface (GUI) to enable remote administration of the cluster.

\* \* \* \* \*